No. 763,967. PATENTED JULY 5, 1904.
I. DEUTSCH.
POWER TRANSMITTING DEVICE.
APPLICATION FILED APR. 30, 1903.
NO MODEL.

BEST AVAILABLE COPY

Witnesses.
J. E. L. Blackmore
Edward Sarton

Inventor.
Isidor Deutsch
by Fred B. Fetherstonhaugh
atty.

No. 763,967. Patented July 5, 1904.

UNITED STATES PATENT OFFICE.

BEST AVAILABLE COPY

ISIDOR DEUTSCH, OF MONTREAL, CANADA, ASSIGNOR TO ELECTRIC AND TRAIN LIGHTING SYNDICATE, LIMITED, OF MONTREAL, CANADA, A CORPORATION OF CANADA.

POWER-TRANSMITTING DEVICE.

SPECIFICATION forming part of Letters Patent No. 763,967, dated July 5, 1904.

Application filed April 30, 1903. Serial No. 155,078. (No model.)

*To all whom it may concern:*

Be it known that I, ISIDOR DEUTSCH, a citizen of the United States of America, residing at Montreal, in the district of Montreal, in the Province of Quebec, Canada, have invented certain new and useful Improvements in Power-Transmitting Devices, of which the following is a specification.

My invention relates to improvements in power-transmitting devices; and the object of the invention is to devise a mechanism which shall transmit power from a revolving axle in a positive manner and whereby the effect of vibration, oscillation, or any other movement of translation in the axle is provided for and the complication of parts reduced to a minimum, thus lessening the cost of production and liability of breakages on the axle assuming different positions; and it consists, essentially, of a wheel, preferably having gear-teeth, securely attached to the axle and designed to turn therewith, a strap encircling the axle in proximity to the said wheel, a bearing fixedly attached to the strap, a wheel journaled in said bearing and designed to coact with the aforesaid wheel, and an extending arm designed to support the said bearing, the various parts being constructed in detail, as hereinafter more particularly described.

Figure 1:
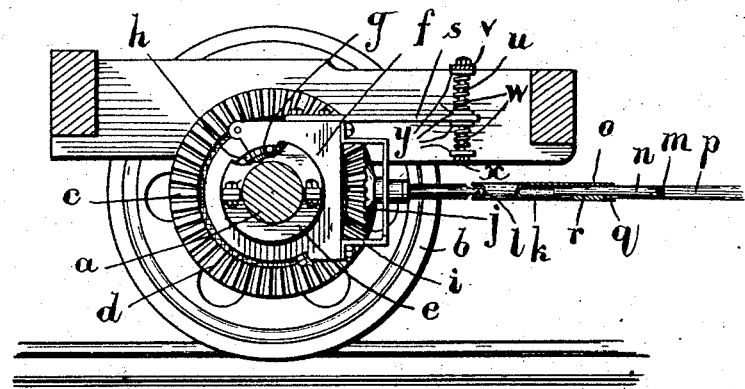
Figure 2:
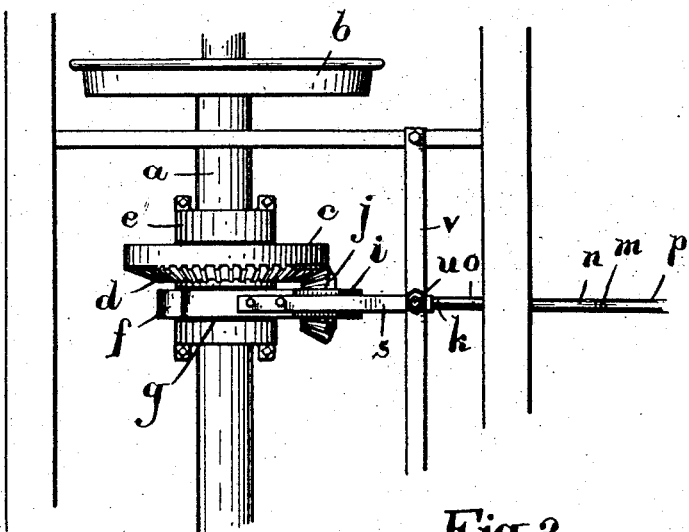
Figure 3:
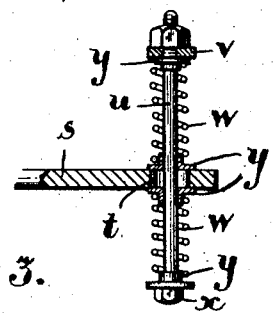

Figure 1 is a view showing an elevation of a portion of the car truck and wheel with my device attached thereto, having the wheel mounted on a sleeve firmly secured to the axle. Fig. 2 is a plan view of the same arrangement as shown in Fig. 1. Fig. 3 is a detail of the supporting-arm.

Like letters of reference indicate corresponding parts in each figure.

$a$ is the axle, and $b$ is a car-wheel, shown here as forming part of an ordinary car-truck.

$c$ is a gear-wheel, preferably split, having the teeth $d$ and shown here as a bevel-gear; but it must be understood that a spur-gear or friction mechanism may be found more advisable in some constructions.

$e$ is a sleeve surrounding the axle $a$ and firmly secured thereon in any suitable manner and designed to turn therewith, carrying the gear-wheel $c$, bolted securely thereto, with it in its revolutions.

$f$ is a split strap bolted securely in the annular groove $g$ in proximity to the gear-wheel $c$.

$h$ represents roller-bearings inserted in the annular groove $g$ between the strap $f$ and the sleeve $e$.

$i$ is a bearing securely bolted to the strap $f$.

$j$ is a pinion designed to coact with the gear-wheel $c$ and journaled in the bearing $i$ and having the shaft $k$ extending therefrom.

$l$ and $m$ are universal joints interposed intermediately in the length of the shaft $k$.

$n$ is the portion of the shaft $k$ attached to the universal joint $m$ and telescoping into the hollow portion $o$, attached to the universal joint $l$.

$p$ is the portion of the shaft attached to the universal joint $m$ and connected at its other end to the machine to be operated.

$q$ is an elongated slot in the portion $n$, and $r$ is a feather-key in the hollow portion $o$ and extending into the slot $q$. It will be thus seen that a sliding motion limited to the length of the slot $q$ is allowed for in the telescoping of the portion $n$ into the portion $o$, and the universal joints will permit any angular change in position between the machine and the driving-gear.

$s$ is an extending arm from the strap $f$, having a hole $t$ in its outer end.

$u$ is a rod of considerably smaller diametrical dimensions than the hole $t$ and extending therethrough and designed to be supported from the cross-bar $v$ at the upper end.

$w$ represents spiral springs above and below the arm $s$ and encircling the rod $u$, a suitable head $x$ being provided on the lower end of the said rod.

$y$ represents thimbles or shields at each of the ends of the spiral springs.

The main object of this invention is to provide for the engagement of the gear-wheels one with the other no matter what the vibration or other movement of translation in the axle, and it will be seen from the above description that the bearing for the pinion will always follow every movement of the axle, for the reason that the said bearing is rigidly supported therefrom in relation to its engagement with the gear-wheel—that is to say, while it may have a limited freedom of movement it cannot possibly be taken from engagement with the said gear-wheel. For instance, in car-trucks in railroad use the axle rounding a curve assumes a different position in relation to the shaft $k$, and if the face of the pinion were not held securely to the face of the gear-wheel the varying positions of the said shaft would be sufficient to cause the stripping of the teeth. It remains therefore for the shaft $k$ to be either flexible or provided with universal joints, so that it will permit the movement of the pinion with the gear according to the movements of the axle. This arrangement also provides for vibration and, in fact, every movement of translation in the axle.

The extending arm supporting the bearing for the pinion is of course a very essential feature in this device, and the means provided at the upper end of the said arm for the movement of the bearing constitute chiefly the practicability of the operations of the mechanism. This means may be provided in more ways than one. For instance, it has been found that to have a support projecting directly from the bearing or strap into an enlarged aperture in the car-truck frame is sufficient to allow for the various movements of the axle; but the arrangement here shown is considered preferable to the absolutely perfect operation of the device.

What I claim as my invention is—

1. In a power-transmitting device, the combination with a support and a car-wheel axle, of a gear-wheel designed to rotate with the axle, a sleeve encircling the axle in proximity thereto and rotating therewith, said sleeve having a journal adjacent to the face of said gear-wheel, a strap having rigidly-supported bearings from one side thereof and an internal bearing for the aforesaid journal, a coacting gear-wheel journaled in said bearings from the strap, and flexible supports from the strap to the support for the car, as and for the purpose specified.

2. In a power-transmitting device, the combination with a support and a car-wheel axle, of a gear-wheel designed to rotate with the axle, a sleeve encircling the axle in proximity thereto and rotating therewith, said sleeve having a journal adjacent to the face of said gear-wheel, a strap having rigidly-supported bearings from one side thereof and an internal bearing for the aforesaid journal, a coacting gear-wheel journaled in said bearings from the strap, a flexible shaft extending from said coacting gear, and flexible supports from the strap to the support for the car, as and for the purpose specified.

Signed at Montreal, in the district of Montreal, in the Province of Quebec, Canada, this 27th day of April, 1903.

ISIDOR DEUTSCH.

Witnesses:
J. E. L. BLACKMORE,
R. T. TROTTER.